(12) United States Patent
Vyas et al.

(10) Patent No.: US 7,344,798 B2
(45) Date of Patent: Mar. 18, 2008

(54) LOW CONTACT RESISTANCE BONDING METHOD FOR BIPOLAR PLATES IN A PEM FUEL CELL

(75) Inventors: Gayatri Vyas, Rochester Hills, MI (US); Michael Budinski, Pittsford, NY (US); Brian K Brady, North Chili, NY (US); Michael J Lukitsch, Port Huron, MI (US); Harald Schlag, Ruesselsheim (DE)

(73) Assignee: General Motors Corporation, Detroit, MI (US)

( * ) Notice: Subject to any disclaimer, the term of this patent is extended or adjusted under 35 U.S.C. 154(b) by 182 days.

(21) Appl. No.: 10/703,299

(22) Filed: Nov. 7, 2003

(65) Prior Publication Data

US 2005/0100771 A1    May 12, 2005

(51) Int. Cl.
*H01M 2/14* (2006.01)
(52) U.S. Cl. ............................. 429/38; 429/32; 429/35; 429/39
(58) Field of Classification Search .................. 429/32, 429/35, 38, 39
See application file for complete search history.

(56) References Cited

U.S. PATENT DOCUMENTS

| RE37,284 E | 7/2001 | Li et al. |
| 6,291,094 B1 | 9/2001 | Yoshimura et al. ............ 429/34 |
| 6,372,376 B1 | 4/2002 | Fronk |
| 6,440,597 B1* | 8/2002 | Mizuno ........................ 429/34 |
| 6,887,610 B2* | 5/2005 | Elhamid et al. ............... 429/35 |
| 2003/0096151 A1 | 5/2003 | Blunk et al. |
| 2004/0067407 A1* | 4/2004 | Sompalli et al. .............. 429/40 |

* cited by examiner

*Primary Examiner*—Bruce F. Bell (57) ABSTRACT

A separator assembly for use in a stack of electrochemical cells is provided, having a first conductive metallic substrate with a first surface and a second conductive metallic substrate with a second surface, wherein each of the first and second surfaces are overlaid with an ultra-thin electrically conductive metal coating. The first and second surfaces form electrically conductive paths at regions where the metal coating of the first and second layer contact one another. The contact of the surfaces overlaid with metal coating is sufficient to join the first and second substrates to one another. Preferred metal coatings comprise gold (Au). Methods of making such separator assemblies are also provided.

22 Claims, 7 Drawing Sheets

LOW CONTACT RESISTANCE BONDING METHOD FOR BIPOLAR PLATES IN A PEM FUEL CELL

FIELD OF THE INVENTION

The present invention relates to fuel cells, and more particularly to an electrically conductive separator assembly and the manufacture thereof, for such fuel cells.

BACKGROUND OF THE INVENTION

Fuel cells have been proposed as a power source for electric vehicles and other applications. One known fuel cell is the PEM (i.e., Proton Exchange Membrane) fuel cell that includes a so-called "membrane-electrode-assembly" comprising a thin, solid polymer membrane-electrolyte having an anode on one face of the membrane-electrolyte and a cathode on the opposite face of the membrane-electrolyte. The anode and cathode typically comprise finely divided carbon particles, having very finely divided catalytic particles supported on the internal and external surfaces of the carbon particles, and proton conductive material intermingled with the catalytic and carbon particles.

The membrane-electrode-assembly is sandwiched between a pair of electrically conductive contact elements which serve as current collectors for the anode and cathode, and may contain appropriate channels and openings therein for distributing the fuel cell's gaseous reactants (i.e., $H_2$ & $O_2$/air) over the surfaces of the respective anode and cathode.

Bipolar PEM fuel cells comprise a plurality of the membrane-electrode-assemblies stacked together in electrical series while being separated one from the next by an impermeable, electrically conductive contact element known as a bipolar or separator plate or septum. The separator or bipolar plate has two working faces, one confronting the anode of one cell and the other confronting the cathode on the next adjacent cell in the stack, and each bipolar plate electrically conducts current between the adjacent cells. Contact elements at the ends of the stack are referred to as end, terminal, or collector plates. These terminal collectors contact a conductive element sandwiched between the terminal bipolar plate and the terminal collector plate. The conductive elements serve as an electrically conductive separator element between two adjacent cells, and typically have reactant gas flow fields on both external faces thereof, conduct electrical current between the anode of one cell and the cathode of the next adjacent cell in the stack, and have internal passages therein through which coolant flows to remove heat from the stack.

The PEM fuel cell environment is highly corrosive, and accordingly, the bipolar plates and the materials used to assemble them must be both corrosion resistant and electrically conductive. Bipolar plates are generally fabricated from two separate conductive sheets, and may be constructed of electrically conductive metal or composite materials. These individual plates are joined together at at least one joint, where an interior is formed between the plates which contains cooling passages. The plates must withstand the harsh conditions of the fuel cell, while providing high electrical conductivity, low weight to improve gravimetric efficiency, and durability for long-term operational efficiency. There remains the challenge to optimize the bonding of electrically conductive elements comprising independent components in a fuel cell to promote efficiency as cost-effectively as possible.

SUMMARY OF THE INVENTION

The present invention provides a separator assembly for use in a stack of electrochemical cells, comprising a first conductive metallic substrate having a first surface and a second conductive metallic substrate having a second surface; each of the first and the second surfaces having an electrically conductive central region and a non-conductive peripheral region. An ultra-thin electrically conductive metal coating overlies one or more areas of the electrically conductive regions of the respective first and the second surfaces. Electrically conductive paths are formed by physical contact between the coated areas of the respective first and the second surfaces. A seal isolates each central electrically conductive region from each peripheral non-conductive region.

Alternate preferred embodiments of the present invention include a method for manufacturing a separator assembly for a fuel cell, comprising providing a first and a second electrically conductive metal substrate, the metal substrate susceptible to formation of metal oxides in the presence of oxygen. Any metal oxides are removed from a first and a second surface of the first and the second substrates, respectively. An ultra-thin electrically conductive metal coating is deposited on select regions of the first and the second metal surfaces. The select regions of the first and the second surfaces are positioned to confront one another and the select regions of the first and the second surfaces are contacted at one or more contact regions, where the contact regions form an electrically conductive path between the first and the second substrates.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

The present invention relates to a simplified separator assembly for a fuel cell system comprising a first and a second substrate overlaid with an ultra-thin electrically conductive metal coating along electrically conductive regions of the surfaces of each substrate. When the first and second substrates, overlaid with the metal coating, are contacted with one another, the metal coating facilitates joining of the first and second substrates together, without need for additional mechanical joining or adhesion to one another, as was previously required. To gain a better understanding of the areas in which the present invention is useful, description of an exemplary fuel cell is provided below.

Figure 1:
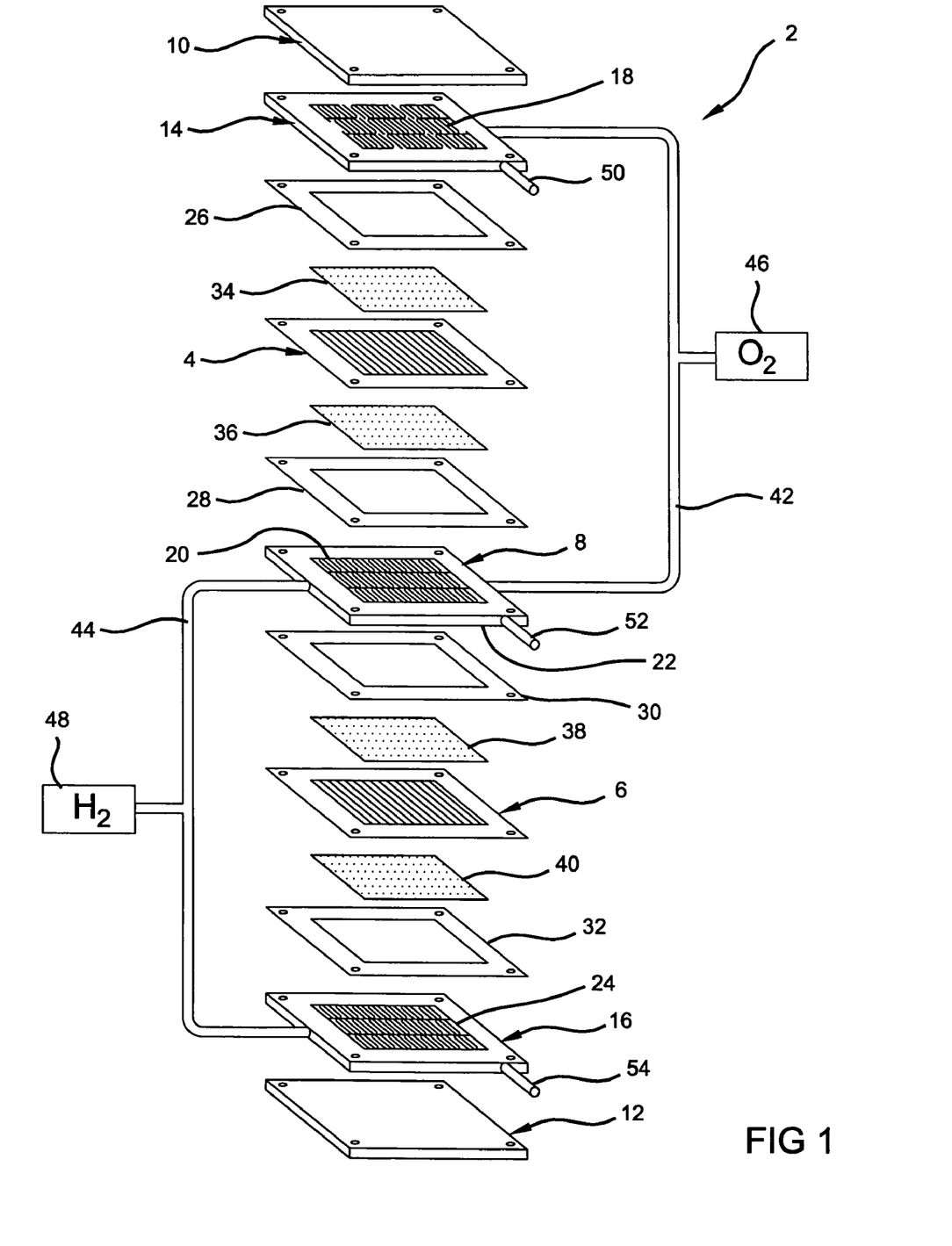
FIG. 1 is a schematic, exploded illustration of a PEM fuel cell stack (only two cells shown)

FIG. 1 depicts a two cell, bipolar fuel cell stack 2 having a pair of membrane-electrode-assemblies (MEAs) 4 and 6 separated from each other by an electrically conductive fluid distribution element 8, hereinafter bipolar plate 8. The MEAs 4 and 6 and bipolar plate 8, are stacked together between stainless steel clamping plates, or end plates 10 and 12, and end contact elements 14 and 16. The end contact elements 14 and 16, as well as both working faces of the bipolar plate 8, contain a plurality of grooves or channels 18, 20, 22, and 24, respectively, for distributing fuel and oxidant gases (i.e. $H_2$ and $O_2$) to the MEAs 4 and 6. Nonconductive gaskets 26, 28, 30, and 32 provide seals and electrical insulation between the several components of the fuel cell stack. Gas permeable conductive materials are typically carbon/graphite diffusion papers 34, 36, 38, and 40 that press up against the electrode faces of the MEAs 4 and 6. The end contact elements 14 and 16 press up against the carbon/graphite papers 34 and 40 respectively, while the bipolar plate 8 presses up against the carbon/graphite paper 36 on the anode face of MEA 4, and against carbon/graphite paper 38 on the cathode face of MEA 6.

Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, ambient air may be supplied to the cathode side as an oxygen source and hydrogen to the anode from a methanol or gasoline reformer, or the like. Exhaust plumbing (not shown) for both the $H_2$ and $O_2$ sides of the MEAs 4 and 6 will also be provided. Additional plumbing 50, 52, and 54 is provided for supplying liquid coolant to the bipolar plate 8 and end plates 14 and 16. Appropriate plumbing for exhausting coolant from the bipolar plate 8 and end plates 14 and 16 is also provided, but not shown.

Figure 2:
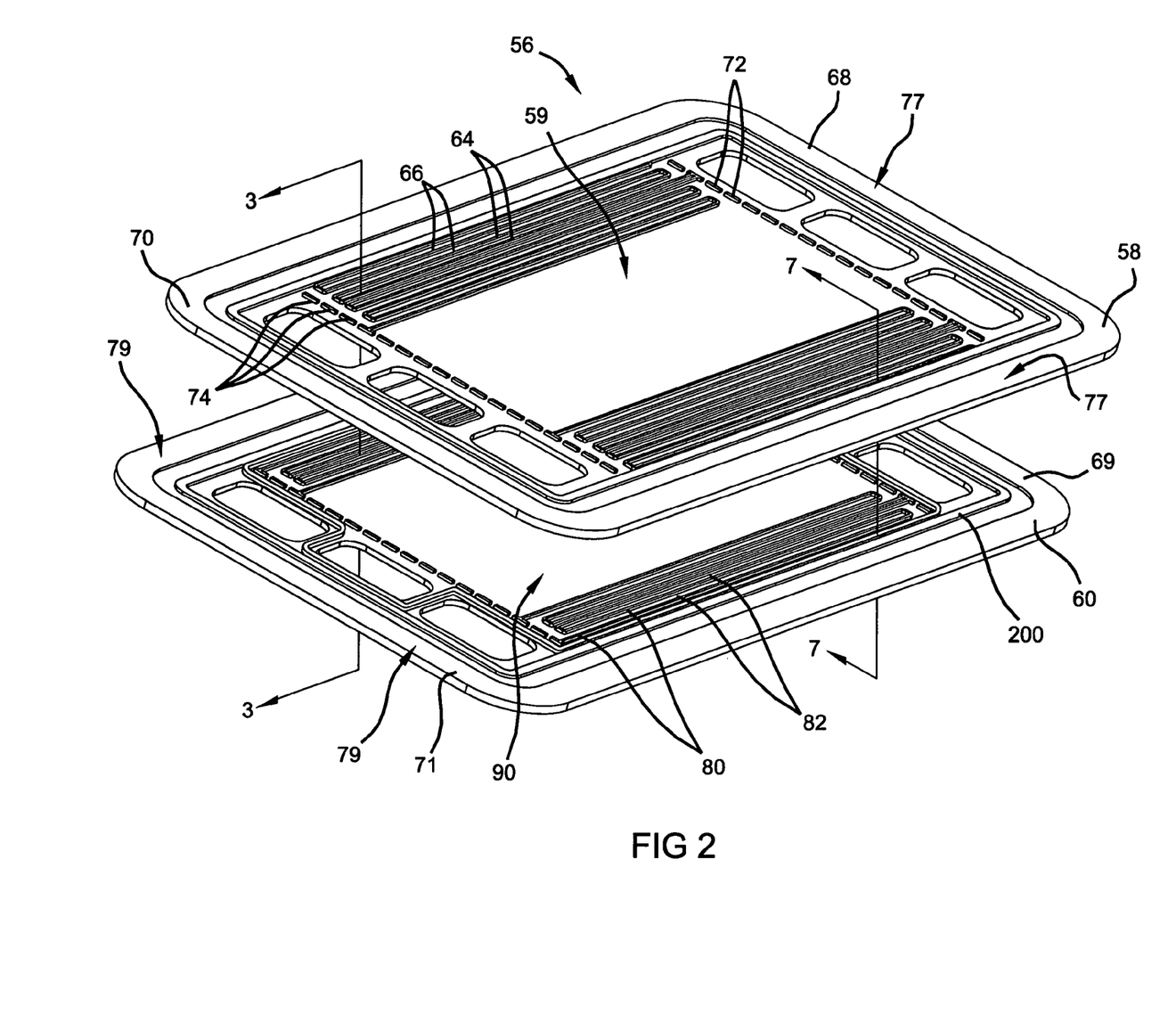
FIG. 2 is an exploded view of an exemplary electrically conductive fluid distribution element useful with PEM fuel cell stacks.

The present invention relates to conductive separator element assemblies in a fuel cell, such as the liquid-cooled, bipolar plate 56 shown in FIG. 2, which separates adjacent cells of a PEM fuel cell stack; conducts electric current between adjacent cells of the stack; and cools the stack. The bipolar plate 56 comprises a first exterior metal sheet 58 and a second exterior metal sheet 60. The sheets 58,60 may be formed from a metal, a metal alloy, or a composite material, and are preferably electrically conductive. The applicability of the present invention is directed to separator elements comprised of metals or metal alloys that are susceptible to passivation, or attack by oxidation wherein a layer of metal oxides is formed on surfaces exposed to oxygen. Suitable metals and metal alloys preferably have sufficient durability and rigidity to function as sheets in a conductive element within a fuel cell. Additional design properties for consideration in selecting a material for the separator element body include gas permeability, conductivity, density, thermal conductivity, corrosion resistance, pattern definition, thermal and pattern stability, machinability, cost and availability. Available metals and alloys include titanium, aluminum, stainless steel, nickel based alloys, and combinations thereof.

The exterior metal sheets 58,60 are made as thin as possible (e.g., about 0.002-0.02 inches or 0.05-0.5 mm thick). The sheets 58,60 may be formed by any method known in the art, including machining, molding, cutting, carving, stamping, photo etching such as through a photolithographic mask, or any other suitable design and manufacturing process. It is contemplated that the sheets 58,60 may comprise a dual structure including a flat sheet and an additional sheet including a series of exterior fluid flow channels. Thus, according to the present invention sheets may be pre-formed by the above described methods and subsequently have an ultra-thin coating applied, or may have an ultra-thin coating applied and then formed (e.g. by stamping).

The external sheet 58 has a first working surface 59 on the outside thereof which confronts an anode of a membrane-electrode-assembly (not shown) and is formed so as to provide a plurality of lands 64 which define therebetween a plurality of grooves 66 known as a "flow field" through which the fuel cell's reactant gases (i.e., $H_2$ or $O_2$) flow in a tortuous path from one side 68 of the bipolar plate to the other side 70 thereof. When the fuel cell is fully assembled, the lands 64 press against the carbon/graphite papers (such as 36 or 38 in FIG. 1) which, in turn, press against the MEAs (such as 4 or 6 in FIG. 1, respectively). For drafting simplicity, FIG. 2 depicts only two arrays of lands 64 and grooves 66. In reality, the lands and grooves 64,66 will cover the entire external surfaces of the metal sheets 58, 60 that engage the carbon/graphite papers. The reactant gas is supplied to grooves 66 from a header or manifold groove 72 that lies along one side 68 of the fuel cell, and exits the grooves 66 via another header/manifold groove 74 that lies adjacent the opposite side 70 of the fuel cell. Each sheet 58,60 has an outer peripheral region 77,79 respectively, which is typically electrically non-conductive because it is external to the region occupied by the electrically active MEA.

Figure 3:
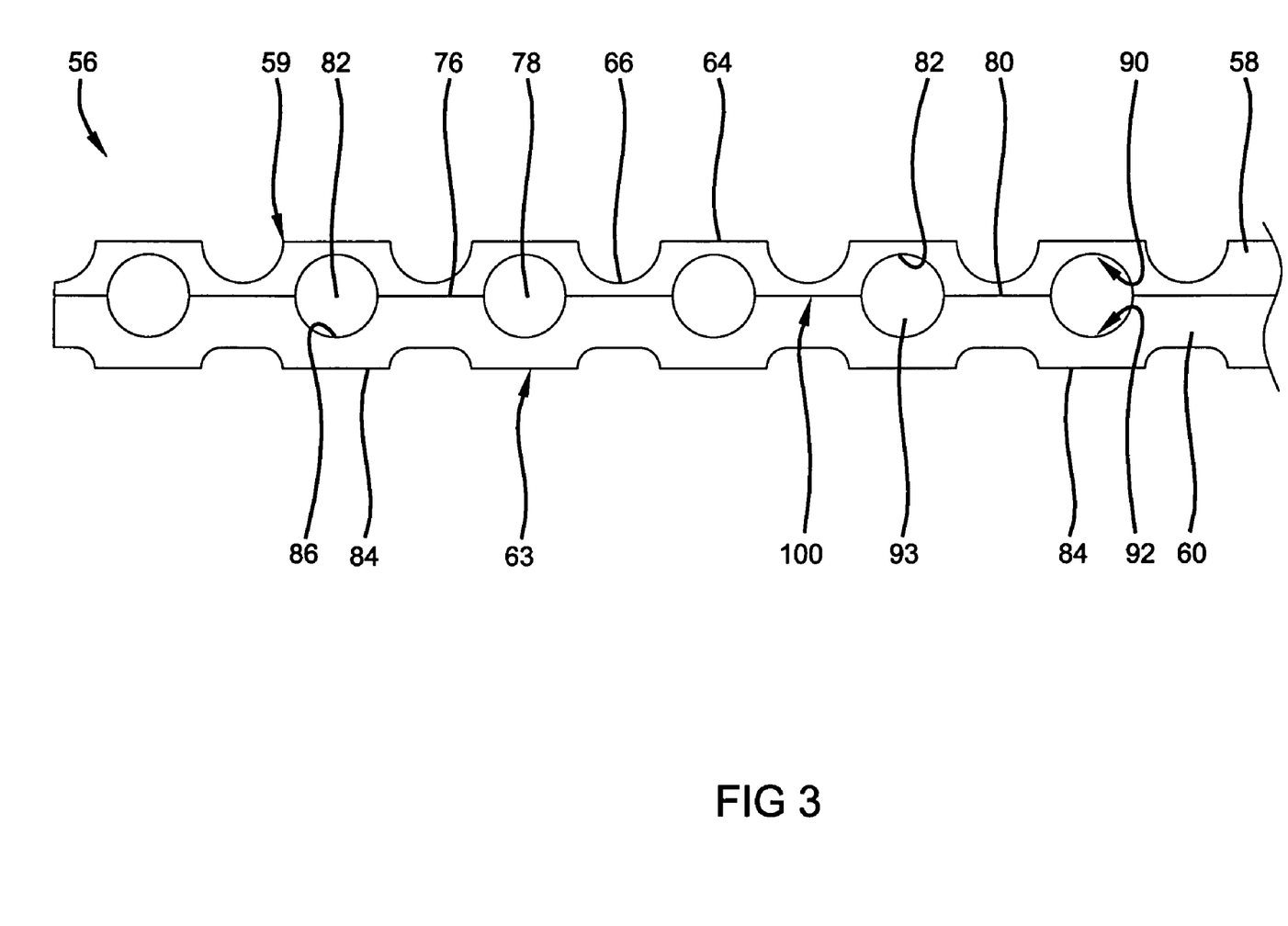
FIG. 3 is a sectional view in the direction of 3-3 of FIG. 2.

As best shown in FIG. 3, the underside of the sheet 58 includes a plurality of ridges 76 which define therebetween a plurality of channels 78 through which coolant passes during the operation of the fuel cell. As shown in FIG. 3, a coolant channel 78 underlies each land 64 while a reactant gas groove 66 underlies each ridge 76. Alternatively, the sheet 58 could be flat and the flow field formed in a separate sheet of material. Sheet 60 is similar to sheet 58. In this regard, there is depicted a plurality of ridges 80 defining therebetween a plurality of channels 93 through which coolant flows from one side 69 of the bipolar plate to the other 71 (as shown in FIG. 2). The heat exchange (coolant side) surfaces 90,92 of the first and second sheets 58,60 confront each other so as to define therebetween the coolant flow passages 93 adapted to receive a liquid coolant, and are electrically coupled to each other at a plurality of joints, or contact regions 100. Electrically conductive paths are formed by physical contact through the contact regions 100. Like sheet 58 and as best shown in FIG. 3, the external side of the sheet 60 has a working surface 63 facing a cathode of another MEA having a plurality of lands 84 thereon defining a plurality of grooves 86 through which the reactant gases pass.

Coolant flows between the channels 93 formed by sheets 58,60 respectively, thereby breaking laminar boundary layers and affording turbulence which enhances heat exchange with inside surfaces 90, 92 of the exterior sheets 58, 60 respectively. As recognized by one of skill in the art, the current collector separator assemblies of the present invention may vary in design from those described above, such as for example, in the configuration of flow fields, placement and number of fluid delivery manifolds, and the coolant circulation system, however, the function of conductance of electrical current through the surface and body of the separator plate elements functions similarly between all designs.

Figure 4:
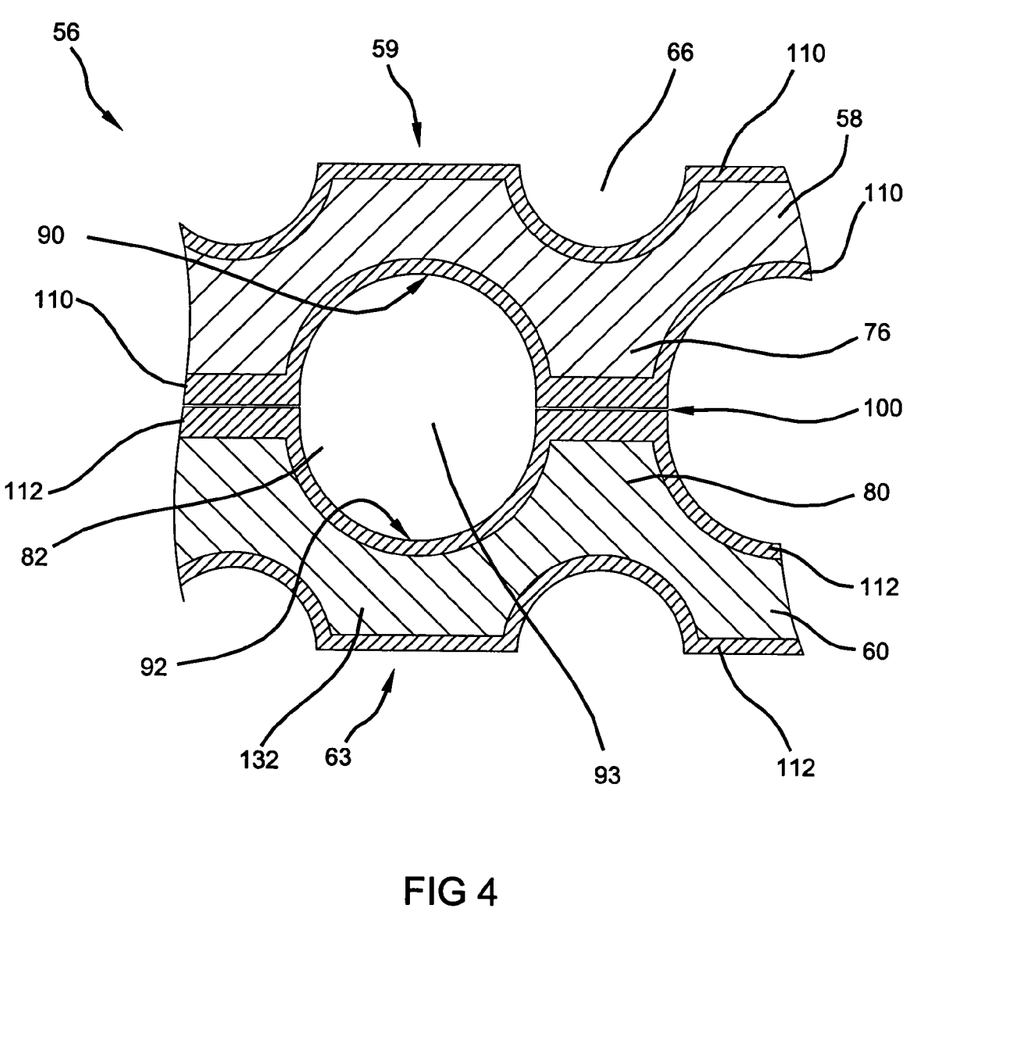
FIG. 4 is a magnified portion of the bipolar plate of FIG. 3.

FIG. 4 is a magnified view of a portion of FIG. 3 and shows the ridges 76 on the first sheet 58 and the ridges 80 on the second sheet 60 are coupled to one another at their respective surfaces 90,92 in the contact region 100 to ensure the structural integrity of the separator element assembly 56. The first metal substrate sheet 58 is joined at the contact region 100 directly (i.e., without an intermediate spacer sheet) to the second substrate metal sheet 60 via a plurality of discrete contact regions 100. The contact region 100 provides an electrically conductive path that is required for the bipolar plate separator element assembly to function as a current collector. The contact region 100 is often referred to by those skilled in the art as the "bond" or "bond line".

In circumstances where the electrical resistance across the contact regions 100 is too high, a significant amount of heat is generated at the contact regions 100, which is transferred to the coolant. It is believed that the conventional way of joining the two metal sheets 58,60 to one another in a separator assembly, typically by welding or brazing, creates "stitches" (as they are known in the art) which are relatively discrete discontinuous regions where the physical and electrical contact is established between the sheets. When electric current is restricted to conduction through the stitches, an uneven current distribution occurs, which causes high resistance and heat in those regions. The heat build-up further contributes to coolant heating, and also potentially to pinholes or ruptures through the membrane in the corresponding regions, due to excessive localized heating. In one aspect of the present invention, it is preferred that the electrical current is evenly distributed entirely across contact regions 100 and that a sustainable electrical resistance across the conductive path is low enough that it does not cause overheating of the coolant or pinholes in the membrane.

In preferred embodiments of the present invention, the first substrate sheet 58 is overlaid with a first electrically conductive oxidation and corrosion resistant metal coating 110 deposited along surface 90 in the electrically active region which corresponds to the area occupied by the MEA (such as 4 or 6 in FIG. 1, respectively). The second substrate sheet 60 is also overlaid with a second electrically conductive oxidation and corrosion resistant metal coating 112 along surface 92, which likewise corresponds to the electrically active region. The coated first and second substrate sheets 58,60 will confront one another at the contact regions 100 which correspond to the areas where the lands 76,80 contact one another. Optionally, the external faces 59 and 63 of sheets 58 and 60 may also be covered with the same metal coating, as shown here, or may alternately remain uncoated (not shown).

Figure 5:
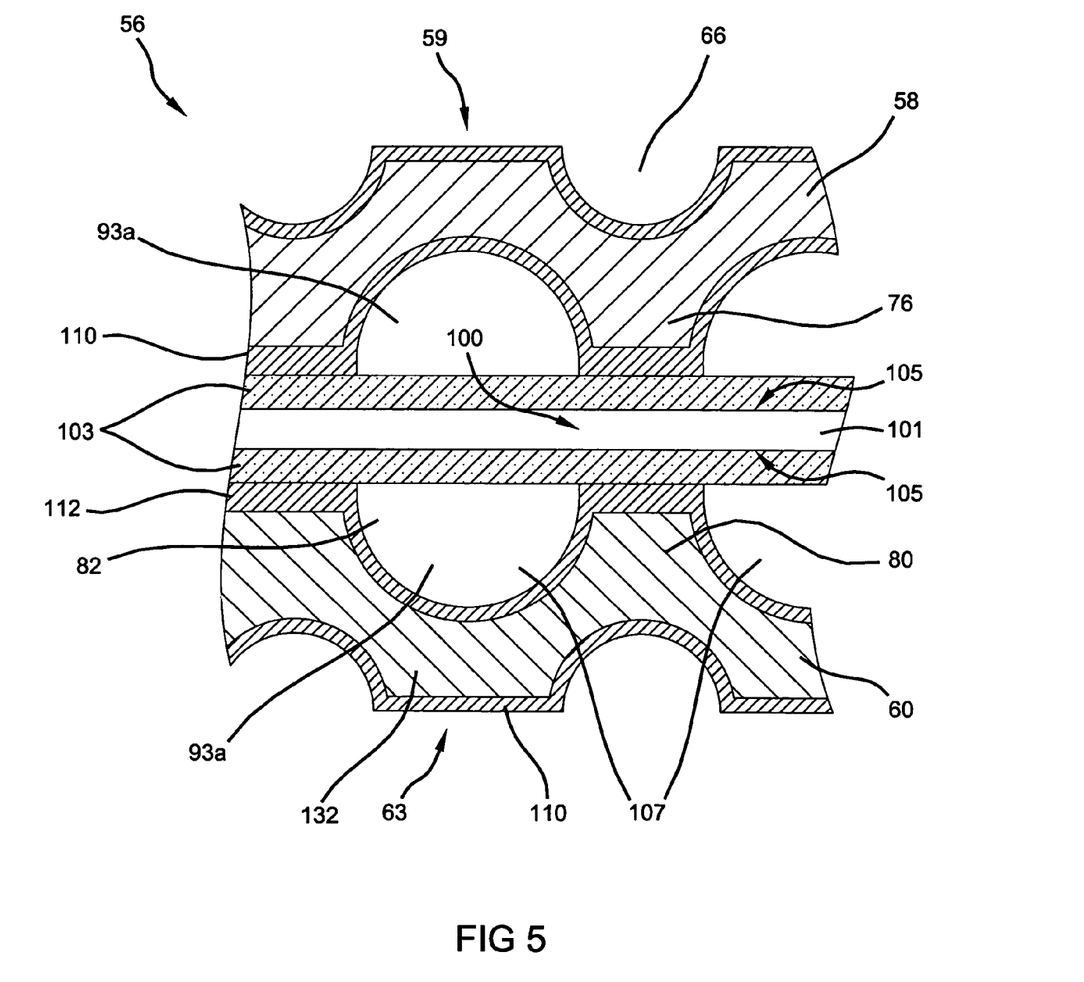
FIG. 5 is a magnified portion of an alternate embodiment of a bipolar plate having a separator sheet disposed within the coolant passage.

The present invention is also applicable to any electrically conductive elements that are joined to one another within the fuel cell. While the first and second sheets 58,60 may be joined directly to each other in accordance with the present invention as shown in FIG. 4, in a bi-polar plate assembly 56, the first and second sheets 58,60 may alternatively be attached to a discrete intermediate, separator conductive sheet 101 (FIG. 5) that may partition the coolant flow passage 93a. The intermediate separator sheet 101 may be perforated so as to permit coolant to move between the smaller coolant flow passages 93a. In such an embodiment, the separator sheet 101 will be treated in accordance with the present invention by applying a metal coating 103 to both contact surfaces 105 of the separator sheet 101 that will contact the metal coatings 110,112 of the first and second conductive sheets 58,60. In one alternate preferred embodiment, the separator sheet 101 may be corrugated to provide a plurality of coolant channels in the coolant flow passage (not shown), or as shown in FIG. 5, may be a flat sheet joined to the first and second outer sheets 58,60 which each have a plurality of coolant flow channels 107 formed therein, as for example by corrugating the outer sheets.

According to the present invention, the metal coating e.g. 103, 110,112 is "ultra-thin", meaning that the thickness of the metal coating is less than 100 nm. A preferred aspect of the metal coating 103 of the present invention is that it has a relatively uniform distributed layer of metal along the substrate sheet 101. A preferred thickness is less than 15 nm, and a most preferred thickness is between about 2 nm to about 10 nm. Such a thickness corresponds to a thickness of less than or equal to the depth of about two atomic monolayers of metal atoms. Fuel cells are preferably operated under compression, and thus during operation pressure is applied to the entire stack, including its several components.

With renewed reference to FIG. 4, the contact established between the first metal coating 110 of the first sheet 58 and the second metal coating 112 of the second sheet 60 creates a sustainable bond which provides joining of the lands 76,80 in a sustained manner such that no additional bonding or physical attachment is needed. Further, the contact region 100 created by the metal coating 110,112 contact provides even current distribution, enhanced long-term durability, and a sustainedly low contact resistance beyond 500 hours of operation. Thinner coatings 110, 112 in accordance with the present invention occupy less volume in fluid flow channels (e.g. coolant channels) and thus provide larger flow paths and decreased pressure drop in comparison with brazing. Additionally, other previous methods of adhering plates introduce a third material, which may degrade or impinge on flow channels, increasing the resistance to flow and pressure drop. The present invention eliminates the need for the third component entirely, thus eliminating any potential obstruction of fluid flow paths.

According to the present invention, it is preferred that the contact resistance is less than 20 mOhm-cm$^2$ measured with a compressive stress of at least 50 psi (350 kPa) pressure applied, and more preferably less than 15 mOhm-cm$^2$, and most preferably between about 7 to about 8 mOhm-cm$^2$, as measured across conductive diffusion paper and through the entire separator assembly. Further, as part of the present invention, it is preferred that all metal oxides are removed from the surfaces 90,92 of metal sheets 58,60 along the regions where the metal coating 110,112 is to be applied, and especially in the contact regions 100 to create as low resistance electrical connection as is possible between the sheets 58,60 through the joined metal coatings 110,112.

Preferred ultra-thin electrically conductive oxidation and corrosion resistant metal coatings 110,112 according to the present invention comprise noble metals, such as silver (Ag), titanium (Ti), and platinum (Pt). A most preferred metal coating for the present invention comprises gold (Au). It should be noted that the first and second metal coatings 110,112 may be the same composition, or may have different compositions, and further may be mixtures of metals. In preferred embodiments, the first and second coatings 110, 112 are of the same composition. One preferred method of depositing the metal coatings 110,112 onto the electrically active regions of the surfaces 90,92 will now be described with reference to FIG. 6. In order to deposit the conductive coating 110,112 onto the substrate, an ion-assisted, physical vapor deposition (PVD) method is employed.

Figure 6:
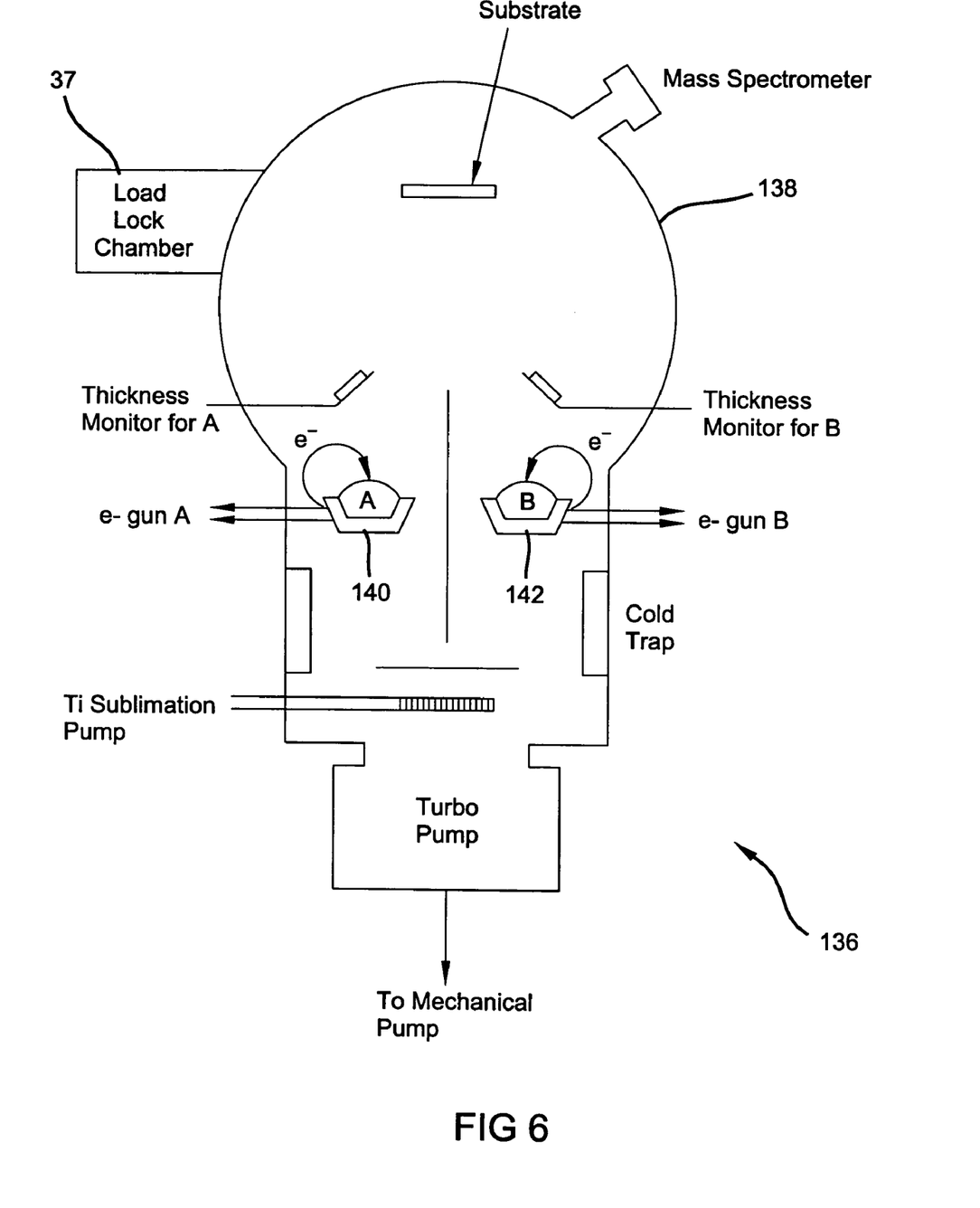
FIG. 6 is an illustration of an ion-beam assisted physical vapor deposition apparatus used to coat the bipolar plates with the electrically conductive material.

As can be seen in FIG. 6, an ion-assisted PVD apparatus 136 is used. The apparatus 136 includes a deposition chamber 138 and two electron guns, A and B, for deposition of metal coating 110,112. The apparatus 136 also includes a low energy ion gun which is used for sputter cleaning of the substrates, and a turbo pump which allows the apparatus to operated in an ultra-high vacuum. The substrate to be coated with the conductive coating 110,112 is first placed in a "load-lock" chamber 137 where the pressure is between about $1\times10^{-5}$ to $1\times10^{-6}$ Torr ($1\times10^{-3}$ Pa to $1\times10^{-4}$ Pa). The substrate to be coated by the metal coating 110,112 is then transferred in the deposition chamber 138.

Once the substrate is placed into the deposition chamber 138, the pressure is lowered to about $1\times10^{-9}$ Torr ($1\times10^{-7}$ Pa). A first crucible 140 in the chamber holds the noble metal to be deposited. If a combination of metals or noble metals is to be deposited, a second metal is held by a second crucible 142. For example, a crucible 140 containing titanium to be deposited as a first layer and crucible 142 containing gold to be deposited over the titanium as a second layer is not out of the scope of the present invention. Another option available may be to deposit a combination of metals simultaneously.

The ion gun is used to sputter clean the substrate. As the ion gun sputter cleans the substrate, a beam of electrons is used to melt and evaporate the noble metals. Such a process may also be known as electron beam evaporation. The target metals are then deposited on the substrate at a rate of 0.10 nm/s to a thickness of less than 100 nm, which is observed by thickness monitors.

A unique aspect of the ion-assisted PVD method is that the substrate is sputter cleaned and the conductive coating is deposited essentially simultaneously. By sputter cleaning and coating the substrate simultaneously, the conductive metal coating 110,112 may be deposited onto the substrate at ultra-low thicknesses of less than 100 nm, preferably less 15 nm, and most preferably between 2 nm to about 10 nm. When the metal coating 110,112 has a thickness of 2-15 nm, the conductive coating preferably has an estimated loading of 0.004-0.03 mg/cm$^2$.

The present application process is preferred over certain processes that sequentially clean and deposit. When the substrate used is a metal substrate such as titanium or stainless steel, an oxide film forms in the time between where the cleaning occurs to where physical vapor deposition deposits the metal onto the substrate when there is exposure to oxygen. By simultaneously cleaning the substrate and depositing the noble metal, the oxide layer is completely and continuously removed thus preventing or at least significantly reducing oxide formation or other fouling of the surface. Simultaneously cleaning the substrate and depositing the noble metal can be accomplished due to the fact that the ion energies required to remove the oxide layer are low. Since the ion energies are low, the bombarding ion fluxes are generally smaller than the depositing atom fluxes that are emitted by the electron guns A and B. This is because oxides being removed are lighter than the metal being deposited onto the substrate as conductive coating 110,112. As such, the low energy ion gun removes only the oxide layer and not the conductive metal coating 110,112. The result is that the metal coating 110,112 is deposited having excellent adhesion to the substrate. Further it is possible to coat only a very thin layer, on the order of about 2 to about 15 nm, which equates to greater than or equal to two atomic monolayers of metal atoms, thereby achieving good surface coverage and relatively uniform coverage. Thus, the use of ion-assisted, PVD allows the noble metal to be deposited on the substrate very smoothly, evenly, and in a thin layer.

It should be understood that an important feature of the invention is the deposition of a metal coating 110,112 on an essentially clean surface 90,92. In a preferred aspect of the present process, the ion gun surface cleaning of the substrate is commenced just before the metal deposition is initiated. Then, the cleaning and metal deposition proceed simultaneously to completion of the deposition process. However, other methods of removing the oxide layer include a variety of suitable processes which may be conducted prior to coating, such as cathodic electrolytic cleaning, mechanical abrasion, cleaning the substrate with alkaline cleaners, and etching with acidic solvents or pickle liquors.

As stated above, by depositing the metal coating 110,112 onto a clean surface, the coating's adhesion is greatly improved, and thus resists delamination from the substrate. For example, when a coating is subjected to cycles of an applied cathodic current ranging from 10 mA/cm$^2$-50 mA/cm$^2$ in a solution of 0.5 M H$_2$SO$_4$, hydrogen gas (H$_2$) is evolved which causes prior art coatings to delaminate or peel, from the substrate. However, when the coating is deposited by the ion-assisted, PVD method of the present invention, the coating's excellent adhesion to the clean surface of the substrate resists the delamination from the substrate caused by the evolved H$_2$ when the cathodic current is applied.

Another preferred PVD method that is also suitable for the present invention, includes magnetron sputtering, where a metal target (the metal coating 130 compound) is bombarded with a sputter gun in an argon ion atmosphere and the substrate is charged. The sputter gun forms a plasma of metal particles and argon ions that transfer by momentum to coat the substrate. The use of ion-assisted PVD as previously described may provide better control of plasma than in other methods of application, because, for example, in sputtering the direction of the plasma may be harder to regulate and ion-assisted PVD provides better control of the deposition parameters due to the fact that the ion beams have low energy and are well collimated, with divergence angles of only a few degrees. However, various factors may promote the use of one application method over another, including overall processing time and cost.

Other preferred methods of applying the metal coating 110,112 according to the present invention include electron beam evaporation, where the substrate is contained in a vacuum chamber (from between about $1\times10^{-3}$ to $1\times10^{-4}$ Torr ($1\times10^{-1}$ Pa to $1\times10^{-2}$ Pa)) and a metal evaporant is heated by a charged electron beam, where it evaporates and then condenses on the target substrate. The metal coatings 110,112 may also be applied by electroplating (e.g. electrolytic deposition), electroless plating, or pulse laser deposition.

In a first experiment, the ion-assisted, PVD method of the present invention was employed to prepare two samples.

The ion gun that was used was set at 100 eV Ar+ beam with a current density of 1 mA/cm² for two minutes. The evaporation source material was 99.99% pure gold from Johnson-Matthey. The 316L stainless steel substrates used were 1"×1" coupons that were first cleaned in an ultrasonic bath of acetone, then methanol for 15 minutes each. The stainless steel substrates were then loaded into the deposition chamber of the ion-assisted PVD apparatus and held there until the pressure was less than $2\times10^{-7}$ Torr ($3\times10^{-5}$ Pa). The base pressure of the deposition chamber was typically in the mid $1\times10^{-9}$ Torr ($1\times10^{-7}$ Pa) range and always lower than $1\times10^{-8}$ Torr ($1\times10^{-6}$ kPa). As the ion gun cleaned the stainless steel substrate, a gold coating was deposited with the single electron beam evaporation source at a rate of 0.10 nm/s at a temperature of 35 degrees Celsius to 40 degrees Celsius. The gold coatings showed excellent adhesion, even after being placed in a corrosion test solution that simulates fuel cell conditions (e.g. pH=3.0, 10 ppm HF) for almost 100 hours at approximately 80° C.

In a second experiment, the metal coating 110,112 was applied to the surface of two samples by a Teer magnetron sputter system. The 316L stainless steel substrates were provided as a 1"×1" coupons that were first sputter cleaned at 400 V. The evaporation source material was 99.99% pure gold from Johnson-Matthey, and was applied in a closed field unbalanced magnetic field at 50 V bias using 0.2 A for a duration of one minute to achieve a thickness of approximately 10 nm.

Contact resistance measurements were taken by contacting the coated surfaces of both of the samples from the first and the second experiments, respectively. The samples were compressed together between two diffusion media papers (i.e. Toray graphite diffusion media commercially available as Toray 060) and a pressure from between 50 to 200 psi (350 to 1400 kPa) was applied while 1 A/cm² current density was applied. Contact resistance measurements were obtained from the voltage drop between the diffusion media sandwiching the two metal coupons across the coating. At an applied pressure of 50 psi (350 kPa) the first experiment assembly had a maximum contact resistance value of 18 mOhm-cm² and a minimum contact resistance value of 10 mOhm-cm² at an applied pressure of 200 psi (1400 kPa). The assembly from the second experiment resulted in a maximum contact resistance of 19 mOhm-cm² at an applied pressure of 50 psi (350 kPa) and a minimum contact resistance value of 9.2 mOhm-cm² when 200 psi (1400 kPa) is applied.

Samples from the first and second experiments were also tested for corrosion current values. Stainless steel substrates coated with 10 nm Au from the both the first and second experiments enabled low corrosion currents while cycling the potential between +0.4 and +0.6 V (vs. Ag/AgCl) in aerated solution at 80 degrees Celsius, thereby simulating a bipolar plate environment in a fuel cell (pH=3.0, 10 ppm HF, and 0.5M $Na_2SO_4$ as the supporting electrolyte). Potentiostatic corrosion experiments were conducted over 100 hours at both an applied potential of +0.6 V (Ag/AgCl, in air) and at −0.4V (Ag/AgCl, in hydrogen) in an aerated simulated fuel cell solution operated at 80 degrees Celsius. The measured current conditions were below 1 microamp/cm² for both the first and second samples, indicating good stability of the coating.

Stainless steel bipolar plates assembled according to the present invention and having an active area of 250 cm² were coated at different thicknesses to compare electrical performance of the gold metal coatings. The results of this testing are shown below in Table 1.

The first set of plates were coated by PVD at a thickness of about 10 nm, according to the present invention. The second set of plates were coated by PVD at a thickness of about 100 nm. The third set of plates were electroplated and had a thickness ranging from about 212-260 nm. A current of 200 amps was applied at a current density of 0.8 A/cm² for all samples of plates tested, and all bipolar plate assemblies were tested under a compression pressure of 180 psi. Measurements were taken from 1) a top (i.e. anode side) diffusion paper (designated as "$P_t$") to an anode plate, 2) a bottom (i.e. cathode side) diffusion paper (designated as "$P_b$") to a cathode plate, and 3) a top diffusion paper to bottom diffusion paper through the anode and cathode plates. An interface resistance was calculated by subtracting the respective anode and cathode side measurements from the total paper to paper measurements from top to bottom. As can be observed, the samples prepared in accordance with the present invention (set 1) demonstrate equally low resistance to any of the thicker coatings (sets 2 and 3) and have a negligible interface resistance in comparison to other parts of the fuel cell assembly.

TABLE I

| | Anode Plate Number | Cathode Plate Number | Gold Thickness (nm) | Coating Process | 1 $P_t$/Anode (mOhm-cm²) | 2 $P_b$/Cathode (mOhm-cm²) | 3 $P_t/P_b$ (mOhm-cm²) | Interface Resistance (mOhm-cm²) |
|---|---|---|---|---|---|---|---|---|
| Set 1 | 07-1336 | 10-1336 | 10 | PVD | 3.90 | 4.30 | 9.30 | 1.10 |
| | 07-1332 | 10-1332 | 10 | PVD | 3.80 | 4.50 | 9.40 | 1.10 |
| | 07-1337 | 10-1333 | 10 | PVD | 3.80 | 4.60 | 9.60 | 1.30 |
| | 07-1338 | 10-1323 | 10 | PVD | 4.30 | 4.80 | 11.00 | 2.00 |
| | 07-1335 | 10-1335 | 10 | PVD | 6.00 | 4.30 | 11.80 | 1.50 |
| Set 2 | 07-1353 | 10-1322 | 100 | PVD | 4.00 | 4.50 | 9.40 | 0.90 |
| | 07-1333 | 10-1320 | 100 | PVD | 3.50 | 4.30 | 9.10 | 1.40 |
| | 07-1344 | 10-1328 | 100 | PVD | 4.40 | 4.60 | 10.80 | 1.80 |
| | 07-1343 | 10-1326 | 100 | PVD | 3.10 | 4.50 | 9.10 | 1.50 |
| | 07-1345 | 10-1329 | 100 | PVD | 3.90 | 4.50 | 10.00 | 1.60 |
| Set 3 | 06-0503 | 06-0511 | 260 | Electrodeposition | 4.10 | 4.50 | 10.60 | 2.00 |
| | 06-0504 | 08-0480 | 245 | Electrodeposition | 4.60 | 4.40 | 9.90 | 0.90 |
| | 06-0502 | 08-0483 | 212 | Electrodeposition | 3.60 | 4.90 | 9.80 | 1.30 |
| | 06-0505 | 08-0518 | 260 | Electrodeposition | 5.40 | 4.50 | 11.80 | 1.90 |
| | 06-0479 | 08-0482 | 239 | Electrodeposition | 4.40 | 4.50 | 10.50 | 1.60 |

With renewed reference to FIG. 2, preferred embodiments of the present invention also incorporate a perimeter seal 200 that prevents reactant gases from entering the coolant flow channels (FIGS. 3 and 4 number 93) or exiting the flow channels and flowing into the stack. The seal 200 is preferably formed between contacting inner surfaces 90,92 of the coolant side of the bipolar plate 56. It is preferred that the seal 200 is fluid-tight and is formed by the contact between surfaces 90,92 at the outer perimeter 79 of the electrically active region on inner surfaces 90,92, and prevents, or at least impedes, fluid and gas transport therethrough. The seal 200 circumscribes the coolant flow field to form a barrier to the reactant gases used in the fuel cell stack, and preferably prevents coolant from flowing back into the reactant gases.

Figure 7:
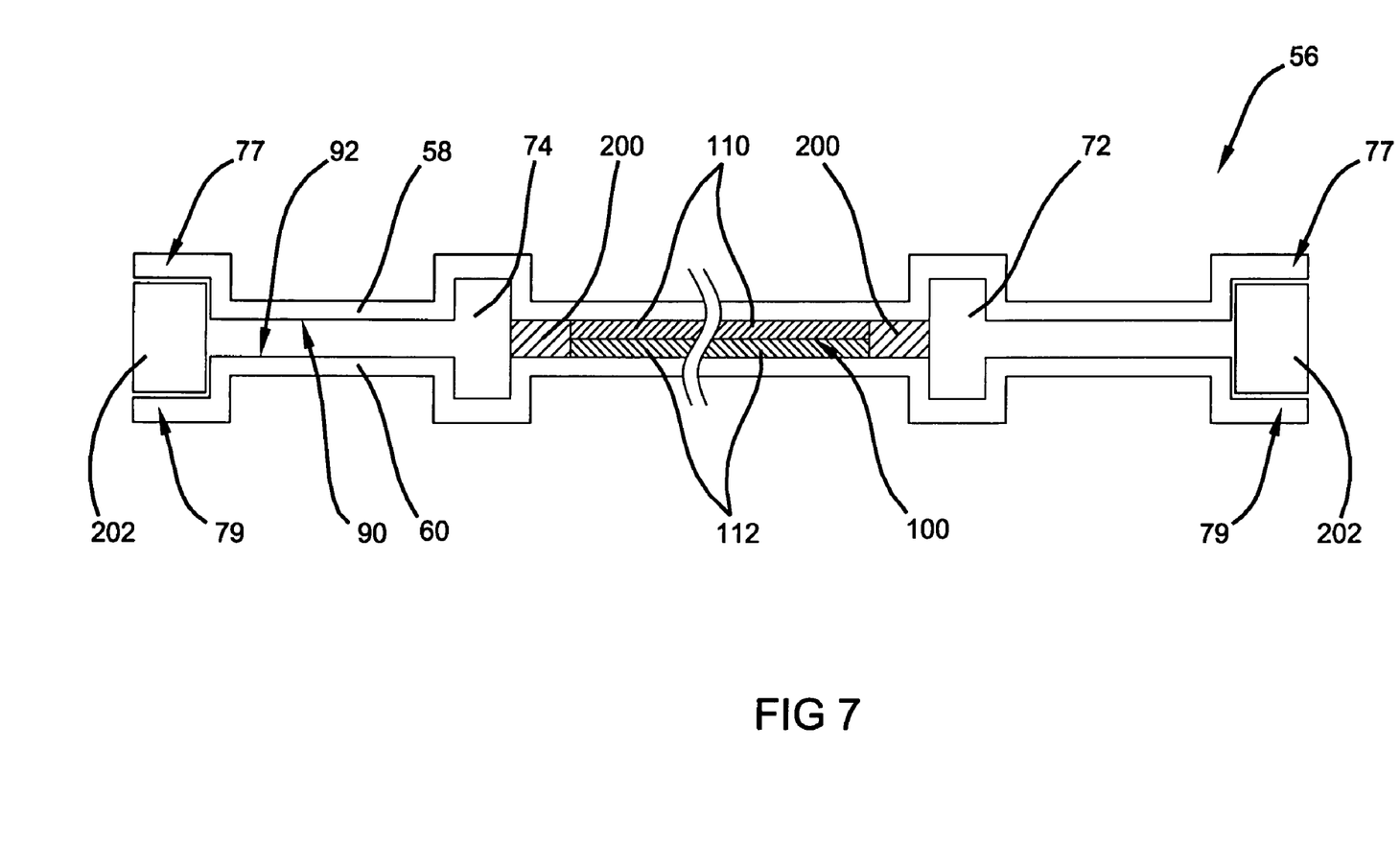
FIG. 7 is cross-sectional view taken along line 7-7 of FIG. 2.

The seal 200 is preferably formed as a bead of either an electrically conductive or an electrically non-conductive adhesive. As best seen in FIG. 7, the seal 200 may further serve to fill any gaps between the sheets 58,60 resulting from manufacturing irregularities. A bead of adhesive can be applied to either one surface of a plate (i.e. either to 90 or 92) of the bipolar separator assembly plates or to both of the surfaces 90,92 of both plates 58,60. A gasket can also be used as the seal 200 in place of the sealant. As shown peripheral gaskets 202 are also used to seal the outer perimeters 77,79 of the bipolar plate assembly 56.

Preferred sealants for the present invention include thermoset and thermoplastic adhesives or pressure sensitive adhesive tapes. In the case of adhesives, the thermoset or thermoplastic polymer adhesives may be molded into preforms that are placed between the first and second sheets 58,60. The sheets 58, 60 are then contacted to one another and heat is applied to create a structural bond. The amount and duration of heating is dependent on the characteristics of the adhesives selected, as recognized by one of skill in the art. Non-limiting examples of such thermoset adhesives include epoxides, phenolics, polymethylmethacrylates, polyurethanes, silicones, polysulfides, butyl, flouroelastomers, and fluorosilicones. Further examples of suitable thermoplastic adhesives include, for example, polyamides, polyesters, polyolefins, polyvinyl acetates, and polyurethanes. In alternate preferred embodiments of the present invention, the seal 200 may be formed by joining plates 58,60 by metallurgical methods, such as remote scanning laser welding or by mechanical crimping. It should also be noted in FIG. 7, that the electrically active regions of surfaces 90 and 92 are overlaid with ultra-thin metal coatings 110,112 on the first and second sheets 58,60 respectively, which establish electrical and physical contact therebetween at contact regions 100.

In one alternate preferred embodiment of the present invention, only the electrically conductive regions of the surfaces 90,92 are coated, and the electrically non-conductive regions are uncoated. In certain preferred embodiments, the entire electrically active region corresponding to the MEA where the flow field is formed is coated with a metal coating, and the peripheral regions 79 (referring to FIG. 2) remain uncoated. In other preferred alternate embodiments, the coating 110,112 may only cover the lands 76,80 and not the grooves 82,86 of sheets 58,60, respectively. In this circumstance, only adjacent electrically conductive surfaces in electrical contact with one another at the contact regions 100 are coated with the metal coating 110,112. In such an embodiment, the electrically non-conductive regions of surfaces 90,92 are covered or masked while the coating is applied. A mask is any material that is applied to a substrate and remains stable during coating application, and may include, by way of example, stainless steel, titanium, or ceramic masks. Other suitable mask materials include: organic coatings, rubber masks, or tape, for use in lower temperature application processes, such as electrolytic or electroless deposition. Often, mask materials are selected to permit recovery and recycling of the metals deposited over the mask during the deposition process, and are well known in the art.

One preferred embodiment of the present invention provides a method for manufacturing a separator assembly for a fuel cell, by providing the first and a second electrically conductive metal substrate sheets, where the first and second sheets are made of a metal susceptible to formation of metal oxides in the presence of oxygen. The metal oxides are removed from the surfaces of the first and second substrates, respectively. An ultra-thin electrically conductive metal coating is deposited on select regions of the first and second metal surfaces. Select regions of the first and second surfaces are positioned to confront one another and then contacted to form an electrically conductive path between the first and second substrates.

The description of the above embodiments and method is merely exemplary in nature and, thus, variations that do not depart from the gist of the invention are intended to be within the scope of the invention. Such variations are not to be regarded as a departure from the spirit and scope of the invention.

What is claimed is:

1. A separator assembly for use in a stack of electrochemical cells, comprising:
    a first conductive metallic substrate having a first surface and a second conductive metallic substrate having a second surface; each of said first and said second surfaces having an electrically conductive central region and a non-conductive peripheral region;
    an ultra-thin electrically conductive metal coating overlying one or more areas of said electrically conductive regions of said respective first and said second surfaces;
    electrically conductive paths formed by physical contact between said coated areas of said respective first and said second surfaces; and
    a seal isolating each said central electrically conductive region from each said peripheral non-conductive region, wherein said seal is an adhesive polymer that is selected from the group consisting of: thermoset and thermoplastic polymers.

2. The separator assembly according to claim 1, wherein a flow field is formed in said electrically conductive region of said first and said second substrates, respectively, each of said flow fields defined by lands interspersed with grooves along said surface and said metal coating is on said lands, and said electrically conductive paths are formed by physical contact between opposing lands of said first substrate and second substrates.

3. The separator assembly according to claim 2, wherein said grooves are non-conductive.

4. The separator assembly according to claim 2, wherein said physical contact between opposing lands of said first and said second surfaces defines fluid flow channels through which a coolant circulates.

5. The separator assembly of claim 1, wherein said substrates are arranged together in a stack and said physical contact is achieved by said stack imparting a compressive stress biasing said substrates towards one another.

6. The separator assembly according to claim 1, wherein said seas creates a barrier that substantially impedes fluid migration from said electrically conductive region to said electrically non-conductive region.

7. The separator assembly according to claim 1, wherein a contact resistance across said first substrate to said second substrate through said electrically conductive paths is less than 10 mOhm-cm$^2$, under a compressive stress of 1400 kPa or greater.

8. The separator assembly according to claim 1, wherein said electrically conductive metal coating comprises gold.

9. The separator assembly according to claim 1, wherein said electrically conductive metal coating has a thickness greater than about 2 nm.

10. The separator assembly according to claim 1, wherein said adhesive polymer is selected from the group consisting of: epoxies, phenolics, polymethyl methacrylates, polyurethanes, silicones, polysulfides, butyls, fluoroelastomers, fluorosilicones, polyamides, polyesters, polyolefins, polyvinyl acetate, and polyurethane.

11. The separator assembly according to claim 1, wherein said first and said second conductive metallic substrates are selected from the group consisting of stainless steel, aluminum, and titanium.

12. A separator assembly for use in a stack of electrochemical cells, comprising:
a first conductive metallic substrate having a first surface and a second conductive metallic substrate having a second surface; each of said first and said second surfaces having an electrically conductive central region and a non-conductive peripheral region;
an ultra-thin electrically conductive metal coating overlying one or more areas of said electrically conductive regions of said respective first and said second surfaces;
electrically conductive paths formed by physical contact between said coated areas of said respective first and said second surfaces; and
a seal isolating each said central electrically conductive region from each said peripheral non-conductive region, wherein said seal is a laser weld.

13. A separator assembly for use in a stack of electrochemical cells, comprising:
a first conductive metallic substrate having a first surface and a second conductive metallic substrate having a second surface; each of said first and said second surfaces having an electrically conductive central region and a non-conductive peripheral region;
an ultra-thin electrically conductive metal coating overlying one or more areas of said electrically conductive regions of said respective first and said second surfaces;
electrically conductive paths formed by physical contact between said coated areas of said respective first and said second surfaces;
a seal isolating each said central electrically conductive region from each said peripheral non-conductive region,
wherein said first substrate has a first opposite side to said first side and said second substrate has a second opposite side to said second side, wherein said first and said second opposite sides are overlaid with said electrically conductive metal coating.

14. The separator assembly according to claim 13, wherein said electrically conductive metal coating has a thickness of less than 15 nm.

15. The separator assembly according to claim 14, wherein said electrically conductive metal coating has a thickness of between about 2 to about 10 nm.

16. The separator assembly according to claim 13, wherein said physical contact between opposing lands of said first and said second surfaces defines fluid flow channels through which a coolant circulates.

17. The separator assembly according to claim 13, wherein said substrates are arranged together in a stack and said physical contact is achieved by said stack imparting a compressive stress biasing said substrates towards one another.

18. The separator assembly according to claim 13, wherein said seal creates a barrier that substantially impedes fluid migration from said electrically conductive region to said electrically non-conductive region.

19. The separator assembly according to claim 13, wherein a contact resistance across said first substrate to said second substrate through said electrically conductive paths is less than 10 mOhm-cm$^2$, under a compressive stress of 1400 kPa or greater.

20. The separator assembly according to claim 13 wherein said electrically conductive metal coating comprises gold.

21. The separator assembly according to claim 20, wherein said electrically conductive metal coating has a thickness of less than 15 nm.

22. The separator assembly according to claim 13, wherein said first and said second conductive metallic substrates are selected from the group consisting of stainless steel, aluminum, and titanium.

* * * * *